(12) United States Patent
Brzozowski et al.

(10) Patent No.: US 6,360,511 B1
(45) Date of Patent: Mar. 26, 2002

(54) METHODS OF RE-COATING AND RE-COVERING BITUMEN-BASED BUILT-UP ROOFING MEMBRANES

(75) Inventors: Kenneth J. Brzozowski, Solon; Ken Chernotowich, Twinsburg, both of OH (US)

(73) Assignee: W.P. Hickman Systems Inc., Solon, OH (US)

( * ) Notice: Subject to any disclaimer, the term of this patent is extended or adjusted under 35 U.S.C. 154(b) by 0 days.

(21) Appl. No.: 09/571,123

(22) Filed: May 12, 2000

Related U.S. Application Data

(60) Division of application No. 09/430,431, filed on Oct. 29, 1999, now Pat. No. 6,110,846, which is a continuation-in-part of application No. 09/231,684, filed on Jan. 14, 1999, now abandoned, which is a continuation-in-part of application No. 09/126,144, filed on Jul. 30, 1998, now Pat. No. 5,969,013.

(51) Int. Cl.⁷ .............................................. E04G 23/02
(52) U.S. Cl. ...................... 52/746.11; 52/741.4; 52/408
(58) Field of Search ............................ 52/741.4, 746.1, 52/746.11, 408; 524/66; 427/186, 429

(56) References Cited

U.S. PATENT DOCUMENTS

| | | | | |
|---|---|---|---|---|
| 3,027,342 | A | 3/1962 | Kemp et al. | 524/60 |
| 3,296,165 | A | 1/1967 | Kemp | 524/61 |
| 3,497,371 | A | 2/1970 | Chang | 106/277 |
| 3,835,117 | A | 9/1974 | Walaschek | 524/60 |
| 3,897,380 | A | 7/1975 | Walaschek | 524/60 |
| 4,032,491 | A | 6/1977 | Schoenke | 524/68 |
| 4,079,158 | A | 3/1978 | Kennepohl et al. | 428/143 |
| 4,135,022 | A | 1/1979 | Kennepohl et al. | 428/143 |
| 4,458,043 | A | 7/1984 | Evans et al. | 524/66 |
| 4,544,690 | A | 10/1985 | Ladish | 524/60 |
| 4,610,902 | A | 9/1986 | Eastman et al. | 428/57 |
| 4,824,880 | A | 4/1989 | Algrim et al. | 524/62 |
| 4,835,199 | A | 5/1989 | Futamura et al. | 524/66 |
| 4,866,116 | A | 9/1989 | Ek et al. | 524/430 |
| 4,868,233 | A | 9/1989 | Moran | 524/71 |
| 4,871,792 | A | 10/1989 | Lucke | 524/59 |
| 4,973,615 | A | 11/1990 | Futamura et al. | 524/66 |
| 5,004,772 | A | 4/1991 | Grzybowski et al. | 524/62 |
| 5,047,457 | A | 9/1991 | Higgins | 524/60 |
| 5,051,477 | A | 9/1991 | Yu et al. | 525/194 |
| 5,360,848 | A | 11/1994 | Kuechler et al. | 524/59 |
| 5,854,322 | A | 12/1998 | Mellott | 524/66 |

*Primary Examiner*—Michael Safavi
(74) *Attorney, Agent, or Firm*—Renner, Otto, Boisselle & Sklar

(57) ABSTRACT

A method of recoating a bitumen-based built-up roofing membrane. The roofing membrane is recoated by removing loose mineral aggregate, if any, from the surface of the existing roofing membrane, cleaning the surface of the existing roofing membrane, applying a bitumen based flood coat over the cleaned surface, and embedding a layer of mineral aggregate material into the flood coat. The flood coat comprising a coal tar composition prepared from a blend comprising from about 80 parts to about 98 parts by weight of coal tar having an overall float test of from about 50 seconds to about 220 seconds, from about 2 parts to about 20 parts by weight of coal tar pitch having a softening point of from about 140 to about 160° C., and from about 1% to about 20% by weight, based on 25 the total weight of the composition, of an acrylonitrile-butadiene copolymer.

52 Claims, No Drawings

METHODS OF RE-COATING AND RE-COVERING BITUMEN-BASED BUILT-UP ROOFING MEMBRANES

RELATED APPLICATION

This application is a division of application Ser. No. 09/430,431 filed Oct. 29, 1999 now U.S. Pat No. 6,110,846 which is a continuation-in-part of application Ser. No. 09/231,684 filed Jan. 14, 1999, now ABN which is a continuation-in-part of application Ser. No. 09/126,144 filed Jul. 30, 1998, now U.S. Pat. No. 5,969,013.

FIELD OF THE INVENTION

The present invention relates to built-up roofing systems and methods. More particularly the invention relates to built-up roofing systems for flat or low sloped roofs utilizing a novel coal tar composition as the flood coat.

BACKGROUND OF THE INVENTION

Built-up roofing (BUR) systems generally comprise a substantially rigid deck covered with a membrane comprising multiple layers of bitumen impregnated felt having a separately applied coating of bitumen on top of each layer of felt with a protective layer of small stones or other inert mineral aggregate materials embedded in and covering the top bitumen coating. BUR is used primarily on commercial buildings which have flat or low-slope roofing systems. Its popularity arises from its relatively low cost combined with its effectiveness as a water repellant membrane and its durability.

Bituminous materials, especially asphalt and coal tars, have been utilized as roofing materials particularly in built-up roofing applications, as road paving materials, and as adhesive materials. However, such materials tend to deteriorate under conditions of extreme temperature variations, constant exposure to physical stress, and environmental weathering. Various proposals have been made in the art to modify the bituminous materials to overcome these deficiencies.

Although asphalt and coal tar have a similar appearance when in a package or in a finished roof, they are derived from different raw materials, and they are also different in their chemistry. Coal tar and asphalt generally are incompatible. Coal tar is obtained by heating bituminous coal to very high temperatures and collecting the volatile materials that are produced. These volatiles are referred to as crude coke oven tar, and the solid residue left behind is called coke. The crude coke oven tar is processed to recover a variety of materials including creosote and precursors for a large number of other important chemicals. The residue left after this processing step is called coal tar pitch which comprises primarily aromatic hydrocarbons. The coal tar pitch is the material used in the more familiar applications of roofing and asphalt concrete surface treating.

Asphalt, on the other hand, is derived from petroleum or crude oil and comprises primarily aliphatic hydrocarbons. Crude oil is processed at a refinery by distilling off the "light ends" to produce materials such as propane, gasoline, fuel oils, and chemical intermediates. The residue that remains from the distillation is referred to as straight-run asphalt. Straight run asphalt is processed primarily for road paving applications, and after further processing (e.g., oxidation or blowing), it is converted to roofing asphalts designated as D312 Types I through IV, by the American Society for Testing and Materials (ASTM).

The present invention utilizes compositions which are prepared from coal tar as opposed to compositions which are prepared from asphalt. Aqueous coal tar emulsions have been described in the prior art as useful in preparing protective coatings. In its most common form, an aqueous coal tar emulsion comprises an emulsion of a coal tar in an aqueous medium with an emulsifying or dispersing agent such as an organic soap or detergent and/or an inorganic colloid such as a particulate clay. A conventional practice in the protective coating art is to brush, spray or paint the articles with an aqueous emulsion of coal tar. When the coating of coal tar dries on the article, it provides a protective film. Such films, however, have certain disadvantages such as being attacked by various solvents, being soft, and having inadequate ductility or tensile strength. It has been proposed to improve these properties by including various additives into the emulsions. Thermoplastic rubbers, for example, have been suggested as useful additives for coal tar emulsions to improve solvent resistance and elasticity of the film. In particular, a synthetic acrylonitrile-butadiene latex has been suggested as being useful for adding to coal tar emulsions. U.S. Pat. No. 3,027,342 describes a rubberized coal tar emulsion by dissolving a copolymer of acrylonitrile and butadiene and coal tar to form a solution which can be successfully emulsified in an aqueous medium without the addition of an emulsifying agent. U.S. Pat. No. 3,296,165 describes a coal tar emulsion composition comprising an emulsion coating including an emulsified coal tar/clay mixture and a butyl rubber latex. The compositions described in the '165 patent also include an aluminum powder additive.

U.S. Pat. No. 3,497,371 describes coal tar emulsions containing certain filler materials, a synthetic rubber latex, and certain water-soluble organic amines.

U.S. Pat. Nos. 3,835,117 and 3,897,380 describe rubberized coal tar emulsion compositions especially suitable for sealing bituminous pavement compositions such as asphalt pavement compositions. The rubberized coal tar emulsions described in these two patents are comprised of a major portion of a prepared coal tar pitch emulsion and water and a minor portion of an acrylonitrile-butadiene copolymer latex having an average particle size between 400 and 1000 angstroms, and, optionally, a silicone resin.

U.S. Pat. No. 4,544,690 also describes aqueous rubberized coal tar emulsions. The coal tar emulsions described in this patent comprise a major portion of a commercial coal tar emulsion and water admixed with a small amount of a carboxylated butadiene-styrene-acid copolymer latex having a particular size. The emulsions also may contain a fine mineral filler material such as sand. Such emulsions are reported to exhibit a high degree of spreadability, and to provide a sealing coating that has a long life.

U.S. Pat. Nos. 4,835,199 and 4,973,615 describe bituminous compositions comprising a blend of bitumen (including asphalts and tars) and a thermoplastic elastomer containing at least two polymer blocks wherein one of said polymer blocks is a crystalline polymer block and one of said polymer blocks is an amorphous polymer block. Examples of such thermoplastic elastomers include styrene-butadiene block copolymers. The compositions described in the '615 patent also include a polyolefin.

SUMMARY OF THE INVENTION

In one embodiment, this invention relates to a bitumen-based built-up roofing system comprising a structural deck covered with a membrane comprising:

(A) at least two layers of reinforcement, the bottom layer being attached to said structural deck, (B) a bitumen-based waterproofing adhesive between each layer of reinforcement wherein each layer is adhered to the bitumen-based adhesive between the layers, (C) a bitumen based flood coat over the reinforcement layers, and (D) a protective layer of mineral aggregate material embedded in the flood coat, wherein the bitumen in at least the flood coat comprises a coal tar composition prepared from a blend comprising:

(1) from about 80 parts to about 98 parts by weight of coal tar having an overall float test of from about 50 seconds to about 220 seconds, (2) from about 2 parts to about 20 parts by weight of coal tar pitch having a softening point of from about 140 to about 160° C., and (3) from about 1% to about 20% by weight, based on the total weight of the composition, of an acrylonitrile-butadiene copolymer.

In another embodiment, the present invention relates to a coal tar impregnated reinforcement sheet useful particularly in bitumen-based built-up roofing systems which comprises a layer of reinforcement such as a felt which has been impregnated with a coal tar composition as described above.

In yet another embodiment, the invention relates to a method of re-coating a bitumen-based built-up roofing membrane which comprises the steps of:

(A) removing loose mineral aggregate, if any, from the surface of the existing roofing membrane, (B) cleaning the surface of an existing roofing membrane, (C) applying a flood coat over the cleaned surface, and (D) embedding a layer of mineral aggregate material into the flood coat wherein the flood coat comprises the coal tar composition as described above.

The invention also relates to a method of re-coating a built-up roofing system having a mineral-surfaced cap sheet which comprises the steps of:

(A) cleaning the surface of the mineral-surfaced cap sheet of an existing roofing membrane, (B) applying a flood coat over the cleaned surface, (C) embedding a layer of mineral aggregate material into the flood coat wherein the flood coat comprises the coal tar composition described above.

A method of re-covering a bitumen-based built-up roofing membrane is also described which comprises the steps of:

(A) removing loose mineral aggregate or mineral surfacing, if any, from the upper surface of the existing roofing membrane, (B) cleaning the upper surface of the existing roofing membrane, (C) applying one or more layers of reinforcement, the bottom layer being attached to the cleaned upper surface of the existing roofing membrane, (D) applying a bitumen-based waterproofing adhesive between each layer of reinforcement when more than one layer is applied, and between the bottom layer of reinforcement and the cleaned upper surface of the existing roofing membrane, wherein each reinforcement layer is adhered to the bitumen-based adhesive applied between the layers, and the bottom layer of reinforcement is adhered to the cleaned surface of the existing membrane, (E) applying a bitumen-based flood coat over the applied reinforcement layer or layers, and (F) embedding a protective layer of mineral aggregate material into the flood coat, wherein the bitumen in at least the flood coat comprises a coal tar composition as described above.

DESCRIPTION OF THE PREFERRED EMBODIMENT

The present invention is directed to bitumen-based built-up roofing systems, coal tar impregnated reinforcement sheets useful particularly in built-up roofing systems, methods of re-coating a bitumen-based built-up roofing membrane and methods for re-covering a bitumen-based built-up roofing membrane, all of which are described more fully below, wherein the bitumen in at least the flood coat utilized in the roofing systems and methods comprises coal tar compositions prepared from a blend of materials comprising coal tar, coal tar pitch having certain characteristics, and an acrylonitrile-butadiene copolymer. The coal tar compositions utilized in the present invention are substantially free of water, i.e., they contain less than 0.5% of water. The coal tar compositions, in one embodiment, also are substantially free (i.e., <1% w) of sand or other particulate fillers.

The first ingredient of the coal tar compositions used in the present invention is coal tar. The coal tar which is utilized in the coal tar compositions is a coal tar having a float test of from about 50 seconds to about 220 seconds as determined by ASTM Test D139 entitled Test Method for Float Test for Bituminous Materials which is commonly used for testing the viscosity of semi-solid bituminous material. Such coal tars are of the types conventionally designated as RT-7 to RT-12 coal tars. The coal tars with the higher viscosity ranges such as RT-11 and RT-12 coal tars are preferred, and the most preferred coal tar at the present time is the RT-12 coal tar. RT11 has a float test of 100 to 150 seconds at 50° C. and RT12 has a float test of 150–220 seconds at 50° C. The standard specification for these and other road tars is found in ASTM D490-92. The RT-11 and RT-12 coal tars contain no water and have a minimum specific gravity at 25/25° C. of 1.16.

In one embodiment, up to about 35 parts by weight of the coal tar normally present in the blend can be replaced by coal tars designated by ASTM D450, Types I and III. These have respective softening points (ASTM D36) of 52° C. to 60° C. and 56° C. to 64° C.

A second ingredient of the blend of the coal tar compositions is a coal tar pitch having a softening point of from about 140° C. to about 160° C. More often, the coal tar pitch will have a softening point of from about 145° C. to 155° C. and most often in the range of from about 148° C. to about 152° C. The softening point of the coal tar pitch can be determined by ASTM Test designations D-36, D3104 or D3461. Such coal tar pitches are available commercially, and one source is the Smith Facing & Supply Company, Cleveland, Ohio as flaked coal tar pitch.

A third ingredient of the blend used to prepare the coal tar compositions is a copolymer of acrylonitrile and 1,3-butadiene. Generally, the copolymers will be comprised of a major amount of butadiene and a minor amount of the acrylonitrile. Minor amounts of other monomers may also be present, but the copolymers are preferred. In another preferred embodiment, the copolymers are not cross-linked. The acrylonitrile content of the copolymer may range from about 20% to about 40 or 45% by weight, although it is preferred that the acrylonitrile content of the copolymer is between about 25% to about 35% by weight. As the acrylonitrile content increases, it becomes increasingly more difficult to dissolve the copolymer in the tar. The acrylonitrile-butadiene copolymers also may be characterized as having a Mooney viscosity (ML-4 at 100° C.) in the range of from about 25 to about 100 as determined by ASTM D1646. More often, the Mooney viscosity will be in the range of from about 25 to about 85. Blends of two or more acrylonitrile copolymers also can be utilized to provide coal tar compositions having the desired properties. Useful acrylonitrile-butadiene copolymers are available commercially from, for example, the Chemical Division of Goodyear Tire and Rubber Company, Akron, Ohio under the general trade designation Chemigum, and Zeon Chemicals Inc., Louisville, Ky. under the general trade designation Nipol. Examples of acrylonitrile-butadiene copolymers which are commercially available from Goodyear in bale form include those Chemigum products identified in the following table.

TABLE I

| Chemigum Designation | Bound Acrylonitrile (%) | Mooney Viscosity ML-4 @ 100° C. |
|---|---|---|
| N386B | 40.5 | 55–65 |
| N683B | 33.4 | 25–35 |
| N685B | 33.4 | 45–55 |
| N687B | 33.4 | 65–75 |
| N689B | 33.4 | 79–91 |
| N785B | 27.7 | 45–55 |
| N984B | 20.0 | 35–45 |
| N300 | 40.0 | 50–63 |
| N608 | 33.4 | 63–75 |
| N612B | 33.4 | 20–30 |
| N615B | 33.4 | 47–60 |
| N628B | 33.4 | 68–85 |

Some of the copolymers listed in Table I also are available from Goodyear in powder form and these are identified with a P in place of the N.

The acrylonitrile-butadiene copolymers may contain other materials such as partitioning agents. Examples of useful partitioning agents include polyvinyl chloride and inorganic materials such as powdered calcium carbonate. The amount of partitioning agent present in the acrylonitrile-butadiene copolymers may vary over a wide range although it is generally preferred that the amount of partitioning agent be within the range of from about 5 to about 15% by weight.

As mentioned above, the coal tar compositions useful in the present invention are prepared from a blend comprising the three ingredients described above and the optional coal tar pitch having a softening point in the range of 52–60° C., described above. Generally, the coal tar compositions are prepared from a blend comprising
  (A) from about 80 to about 98 parts. by weight of the coal tar having an overall float test of from about 50 seconds to about 220 seconds,
  (B) from about 2 to about 20 parts by weight of coal tar pitch having a softening point of from about 140° C. to about 160° C., and
  (C) from about 1 to about 20% by weight, based on the total weight of the composition, of an acrylonitrile-butadiene copolymer.

In one embodiment, the blend comprises a mixture of from about 86 to about 98 parts by weight of the coal tar. In another embodiment, the blend comprises from about 5 to about 18 parts by weight more often from about 7 to about 13 parts by weight of the coal tar pitch, and in a further embodiment, the blend comprises from about 5 to about 15% by weight, based on the total weight of the composition, of the acrylonitrile-butadiene copolymer.

As discussed above, up to about 35 parts by weight of the coal tar (A) can be replaced by a coal tar having a softening point in the range of 52°–60° C. or 56° C. to 64° C. In this embodiment, the coal tar compositions may comprise
  (A) from about 50 to about 98 parts by weight of coal tar having an overall float test of from about 50 seconds to about 220 seconds,
  (B) from about 0 to about 35 parts by weight of coal tar selected from coal tars having softening points of about 52° C. to 60° C. and 56° C. to 64° C.,
  (C) from about 2 to about 20 parts by weight of coal tar pitch having a softening point of from about 140° C. to about 160° C., and
  (D) from about 1 to about 20% by weight of an acrylonitrile-butadiene copolymer.

The coal tar, coal tar pitch and acrylonitrile-butadiene copolymer can be blended by any of the known methods used for blending bituminous materials. The order of blending is not critical, although it is preferred first to add the coal tar pitch to the coal tar in a high shear mixing apparatus, and after this mixture is blended and the coal tar pitch is dissolved in the coal tar, the acrylonitrile-butadiene copolymer is added to the hot blended mixture of the coal tar and coal tar pitch in the high shear mixing apparatus which will reduce the copolymer into smaller particles as they are being dispersed into the hot coal tar/pitch mixture. Alternatively, the coal tar and acrylonitrile-butadiene copolymer can be blended followed by the coal tar pitch. It is important that the mixing apparatus should be of the type, which is capable of drawing the lighter weight materials (e.g., the coal tar pitch and the acrylonitrile-butadiene copolymer) into the liquid coal tar. For example, a variety of known stator-rotor and disperser blade units can be used successfully to achieve this result. If this result is not achieved, the light weight materials will float on top and will not be incorporated into the product.

Thus, in one embodiment, the coal tar compositions used in the present invention may be prepared by the process which comprises the steps of
  (A) preparing at an elevated temperature, a first mixture comprising
    (A-1) from about 80 parts to about 98 parts by weight of coal tar having an overall float test of from about 50 seconds to about 220 seconds, and
    (A-2) from about 2 parts to about 20 parts by weight of coal tar pitch having a softening point of from about 140° C. to about 160° C.,
  (B) maintaining the first mixture at a temperature of at least about 170° C.,
  (C) adding to the first mixture, from about 1 to about 20% by weight, based on the total weight of the composition, of an acrylonitrile-butadiene copolymer and
  (D) mixing the copolymer into the second mixture.

The coal tar (A-1) and the coal tar pitch (A-2) generally are heated to a temperature of at least about 170° C., preferably from about 180° C. to about 200° C. prior to mixing in step (A). After all of the coal tar pitch (A-2) is added to the coal tar (A-1) in step A, the mixture is subjected to high shear mixing at elevated temperature to ensure that the pitch is thoroughly blended and dissolved in the coal tar. Thus, mixing is continued in step (B) for a period of from about 3 to about 10 minutes or more. The mixture in step (B) preferably is maintained at a temperature in the range of from about 160° C. to about 200° C., and more often, in the range of from about 165° C. to about 185° C.

The acrylonitrile-butadiene copolymer is added to the first mixture with high shear mixing to form a second mixture while maintaining the second mixture at a temperature of at least about 160° C. and preferably at a temperature of from about 170° C. to about 185° C. After all of the copolymer is added, the second mixture is maintained at the above indicated temperatures for about 30 minutes to 1.5 hours. Successful completion of the mixing process is determined in one embodiment by determining that the softening point of a sample of the blended product is in the desired range of about 55° C. to about 70° C., and more often in the range of about 57–64° C. If the softening point is lower than desired, the softening point can be raised by adding a small amount (e.g., 2.5% w) of the coal tar pitch or of the acrylonitrile-butadiene copolymer (e.g., 1% w) and mixing for an additional 10 to 20 minutes.

In one embodiment, the coal tar compositions used in the present invention generally are characterized as having a Ring and Ball softening point (ASTM D36) of between about 55° C. and 70° C., a penetration range at 25° C. (ASTM D5) of from about 30 to about 90 units, and more often, from about 35 to about 60 units; an elongation (ASTM D412) of at least 800%, preferably from about 800 to about 1500%, and typically at least about 1000%; a tensile strength (ASTM D412) of at least 25 psi, preferably from about 25 to about 100 psi, and typically at about 50 psi; and a cold temperature bend, 1 inch Mandrel (ASTM D3111) of at least about −1° C. (30° F.) more often from about −1° C. to 10° C. (30°–50° F.), and typically, about 2° C. (about 35° F.). In another embodiment, the coal tar compositions of the present invention are characterized as having a softening point in the range of from about 57° C. to about 64° C. (135–148° F.).

The following Table II contains examples illustrating the blends utilized to prepare the coal tar compositions used in the present invention, and some of the properties of the coal tar compositions formed from the blends. The Chemigums used in the examples contain about 8 to 10% of powdered calcium carbonate as a partitioning agent. Unless otherwise indicated in the following examples, in the written description and in the appended claims, all parts and percentages are by weight, temperatures are in degrees centigrade, and pressure is at or near atmospheric pressure.

The blends described in the following table are prepared by the following general procedure. The coal tar is preheated to a temperature of at least 170° C., generally at a temperature within the range of from about 180° C. to about 200° C. and added to a high energy mixing vessel. While maintaining the coal tar at this elevated temperature in the mixing vessel, the coal tar pitch is added, and the contents of the mixing vessel are mixed for at least five minutes while heating to maintain the mixture at the above-indicated elevated temperature to ensure that the coal tar pitch has adequate time to thoroughly dissolve in the coal tar. The heating is necessary also to ensure that the mixture is at the desired temperature before the acrylonitrile-butadiene copolymer is added. Stirring within the mixing vessel should be set to develop a good vortex in the batch and to ensure that the light weight powdered pitch will be drawn down into the liquid tar and result in thorough blending of the two coal tar components.

The acrylonitrile-butadiene copolymer is then added to the reaction vessel while stirring is maintained to provide a good vortex in the batch to ensure that the lighter weight copolymer is drawn into the mix to be completely encapsulated with the coal tar. After about 10 minutes of mixing, or when there is a noticeable increased amperage or power draw by the motor, its speed should be reduced to minimize excessive aeration of the product. After all of the copolymer is added to the mixing vessel, the contents of the vessel are mixed for an additional 60 minutes while maintaining the temperature of the mixture at 170° C. or more. The softening point of the finished product is determined per ASTM procedure D36 (modified by using a digital thermometer with metal probe). When the softening point is found to be in the acceptable range, the finished product can be transferred to a holding tank to await proper packaging conditions.

TABLE II

| | Example | | | | | | | | | | | |
|---|---|---|---|---|---|---|---|---|---|---|---|---|
| | 1 | 2 | 3 | 4 | 5[a] | 6[a] | 7 | 8 | 9[b] | 10[c] | 11 | 12 |
| Ingredients (PHT) | | | | | | | | | | | | |
| RT-12 | 90 | 92.5 | 92.5 | 95 | 95 | 95 | 92.5 | 92.5 | 90 | 90 | 87.5 | 87.5 |
| Coal Tar Pitch* | 10 | 7.5 | 7.5 | 5 | 5 | 5 | 7.5 | 7.5 | 10 | 10 | 12.5 | 12.5 |
| Chemigum N615B | 2 | 2 | 3 | 2 | 8 | 9 | 9 | 10 | 8 | 9 | 8 | 9 |
| Chemigum P609B | 6 | 6 | 7 | 6 | 0 | 0 | 0 | 0 | 0 | 0 | 0 | 0 |
| Properties | | | | | | | | | | | | |
| Softening Point (° F.) | 137 | 133 | 141.5 | 130.5 | 131 | 133.3 | 141 | 141.5 | 136.3 | 140.5 | 144 | 147.5 |
| Penetration (Units) | 74.5 | 73.5 | 85.5 | 85.5 | 66.2 | 86.5 | 65.5 | 85.5 | 58.2 | 44 | 43.5 | 46.5 |
| Elongation (%) | 1580 | 1520 | 1660 | 1630 | 1782 | 1690 | 1488 | 1660 | 1562 | 11250 | 1060 | 910 |

*Coal tar pitch flakes from Smith Facing & Supply - softening point 148–152° C.
(a) Properties are an average of 3 batches
(b) Properties are an average of 5 batches
(c) Properties are an average of 2 batches In the present invention, the coal tar compositions described above are used in built-up roofing (BUR) systems, in preparing coal tar impregnated reinforcement sheets, and in methods of re-coating and re-covering bitumen-based built-up roofing membranes. The coal tar compositions retain the advantages of coal tar, such as water and bacteria resistance, but also exhibit the superior properties which result from the modification with the coal tar pitch and the acrylonitrile-butadiene polymer. Some of these property improvements include: improved compatibility with asphalt, improved elongation and recovery characteristics, improved fatigue resistance, improved adhesive qualities, etc. The coal tar compositions are useful as an interply adhesive, flood-coat or maintenance treatment with improved resistance to cold cracking typically experienced at lower temperatures with standard coal tar. The coal tar compositions also may be utilized as surface coatings for aged built-up roofs to restore waterproofing characteristics and to add service life to the membranes. More particularly, the coal tar compositions of the present invention are useful as a high performance surfacing bitumen for ASTM D450 Type I or Type IIII coal tar built-up membranes; as floodcoats for new built-up roof systems constructed with ASTM D312 asphalts, Types I through IV; as maintenance topcoats for coal tar and aged asphalt roofs; and as an interply adhesive.

More particularly, the invention relates, in one embodiment, to a bitumen-based built-up roofing system comprising a structural deck covered with a membrane comprising:

(A) at least two layers of reinforcement, the bottom layer being attached to said structural deck, (B) a bitumen-based waterproofing adhesive between each layer of reinforcement wherein each layer is adhered to the bitumen-based adhesive between the plies, (C) a bitumen based flood coat over the reinforcement layers, and (D) a protective layer of mineral aggregate material embedded in the flood coat, wherein the bitumen in at least the flood coat comprises a coal tar composition prepared from a blend comprising:

(1) from about 80 parts to about 98 parts by weight of coal tar having an overall float test of from about 50 seconds to about 220 seconds, (2) from about 2 parts to about 20 parts by weight of coal tar pitch having a softening point of from about 140 to about 160° C., and (3) from about 1% to about 20% by weight, based on the total weight of the composition, of an acrylonitrile-butadiene copolymer.

The membrane forms a semi-flexible waterproof covering, and may contain from 2 to as many as 5 layers of the reinforcement. The number of layers affects membrane durability. Each layer provides additional waterproofing through the reinforcement and adhesive layer. It is generally believed that each layer adds to the service life of the membrane. Generally, the reinforcement comprises roofing felts or webs which stabilize and reinforce the membrane, like steel reinforcement in a concrete slab, providing most of its tensile strength. The felt fibers of the reinforcement restrain the bitumen from flowing in hot weather and resist contraction stresses and cracking in the winter. The felt reinforcement layers also isolate the different layers of bituminous waterproofing.

The roofing felts or webs used as a reinforcement in the membranes of the built-up roofing systems generally are woven or nonwoven fabrics classified as either organic (cellulosic or synthetic polymers) or inorganic (glass fiber) or combinations thereof. Examples of organic felts include those prepared from shredded wood, mixed paper and corrugated board, and those prepared from synthetic polymeric materials such as polyesters. The organic felts used as reinforcement in the membranes of the present invention generally are impregnated or saturated and/or coated with bitumen which may be asphalt, coal tar, or the novel coal tar compositions described above. In this patent application, the terms saturated and impregnated will be considered equivalent when referring to bitumen-saturated or impregnated reinforcement. Because glass-fiber mats do not absorb asphalt readily, a much harder coating-grade asphalt is used as binder. The synthetic polymeric mats such as the polyester fiber mats generally, but not always, are prepared as spun bonded mats using resins as binders. They are sometimes needle punched to entangle the fibers and make them more resistant to delamination. The synthetic-polymer mats have been used as bitumen-free mats, bitumen-impregnated mats, and bitumen-coated mats. Coated felts are saturated felts (impregnated felts) that have been subjected to an additional manufacturing stage, namely, coating with an asphalt and stabilizing with finely ground minerals, silica, slate, dust, talc, dolomite, trap rock, or mica to improve their durability and resist cracking in cold weather.

The felts and webs normally used as reinforcements in built-up roofing membranes can be used in the roofing systems of the present invention. Thus, the layers of reinforcement in the membranes may comprise layers selected from the group consisting of bitumen saturated organic felt, bitumen impregnated glass fiber, bitumen-free glass fiber felt, bitumen coated and uncoated polyester fabric, and combinations thereof. In other words, the built-up roofing system may comprise some layers of bitumen-saturated organic felt and some layers of bitumen impregnated glass fiber felt, or any other combination of available reinforcing materials.

Specifications (standards) have been established by ASTM for various materials used in built-up roofing, and these are known to those skilled in the art. These include:

TABLE III

| ASTM Designation | Title |
| --- | --- |
| D224 | Specification for Smooth-Surfaced Asphalt Roll Roofing (Organic Felt) |
| D226 | Specification for Asphalt-Saturated Organic Felt Used in Roofing and Waterproofing |
| D227 | Specification for Coal-Tar-Saturated Organic Felt Used in Roofing and Waterproofing |
| D249 | Specification for Asphalt Roll Roofing (Organic Felt) Surfaced with Mineral Granules |
| D312 | Specification for Asphalt Used in Roofing |
| D450 | Specification for Coal-Tar Pitch Used in Roofing, Dampproofing, and Waterproofing |
| D1668 | Specification for Glass Fabrics (Woven and Treated) for Roofing and Waterproofing |
| D2178 | Specification for Asphalt Glass Felt Used in Roofing and Waterproofing |
| D2626 | Specification for Asphalt-Saturated and Coated Organic Felt Base Sheet Used in Roofing |
| D3909 | Specification for Asphalt Roll Roofing (Glass Felt) Surfaced With Mineral Granules |
| D4601 | Specification for Asphalt-Coated Glass Fiber Base Sheet Used in Roofing |
| D4990 | Specification for Coal Tar Glass Felt Used in Roofing and Waterproofing |
| D5665 | Specification for Thermoplastic Fabrics Used in Cold-Applied Roofing and Waterproofing |
| D5726 | Specification for Thermoplastic Fabrics Used in Hot-Applied Roofing and Waterproofing |
| D6152 | Specification for SEBS-Modified Mopping Asphalt Used in Roofing |
| D6162 | Specification for Styrene Butadiene Styrene (SBS) Modified Bituminous Sheet Materials Using a Combination of Polyester and Glass Reinforcements |
| D6163 | Specification for Styrene Butadiene Styrene (SBS) Modified Bituminous Sheet Materials Using Glass Fiber Reinforcements |

TABLE III-continued

| ASTM Designation | Title |
|---|---|
| D6164 | Specification for Styrene Butadiene Styrene (SBS) Modified Bituminous Sheet Materials Using Polyester Reinforcements |

As noted above, bitumen-based waterproofing adhesive is between each of the layers of reinforcement so that each layer is adhered to the bitumen-based adhesive between the layers. The interlayer bitumen adhesive is generally applied at a rate of about 15 to about 30 lbs/100 ft$^2$, more often at a rate of about 20 to 25 lbs/100 ft$^2$. In the roofing industry, the unit "100 ft$^2$" is commonly referred to as a "square". Accordingly, the term "square" will be used herein to refer to 100 square feet. Any of the bitumens generally used in roofing systems can be utilized as the interlayer adhesive of the present invention such as petroleum asphalt, SEBS-modified mopping asphalt and coal tar pitch. The novel coal tar compositions described above also can be used as the interlayer adhesive bitumen. Both asphalt and coal tar pitch provide the following physical properties: excellent resistance to water penetration and low water absorptivity; durability under prolonged exposure to weather; good internal cohesion and adhesion to roofing felts and insulation; and thermoplasticity. The bitumen-based waterproofing adhesive generally is applied between each layer by techniques well known to those skilled in the art such as by hot-mopping. The layers of reinforcement are adhered to the interlayer adhesive and generally form, with the interlayer adhesive, a monolithic or unified assembly which will remain intact under normal performance conditions.

In the BUR systems of the present invention, the coal tar compositions described above are applied as a flood coat over the layers of reinforcement, and a protective layer of mineral aggregate material (generally but not necessarily inert) is then applied to the flood coat. The flood coat can be applied by any of the techniques known in the art such as mopping. Generally the weight of flood coat is from about 40 to 100 lbs/square and is more often from about 60 lbs/square to about 80 lbs/square. The mineral aggregate material is applied to a flood coat either immediately or very soon after the flood coat is applied over the reinforcement layers so that about one half of the mineral aggregate will penetrate into and be bonded to the flood coat. The mineral aggregate may comprise gravel, crushed rock, blast-furnace slag, or intumescent materials, and the presence of the mineral aggregate protects the bitumen flood coat from life-shortening solar radiation. The proper size and grading for the aggregate is set forth in ASTM Standard D1863, "Standard Specification for Mineral Aggregate Used in Built-Up Roofs." Generally, the aggregate size should be at least $3/16$ in. and up to $3/4$ in. Through its damming action, the aggregate permits use of heavier, uniform pourings of bitumen with consequently better waterproofing and longer membrane service life. The aggregate also serves as a fire-resistant skin preventing flame spread and protecting the bitumen from erosion and abrasion from foot traffic. The amount of aggregate applied to the flood coat is dependent on the weight of the flood coat and the structural capabilities of the supporting deck system. Thus, the amount applied may range from about 300 to 500 lbs/square with a flood coat of 60–75 lbs/square.

The structural deck to which the membranes and other desirable layers (e.g., base sheet, insulation layers, and/or vapor barrier) are applied is generally a rigid deck forming the base for the roofing system. The basic types of roofing decks commonly used with commercial membrane roofing systems are steel, wood sheathing (sawed lumber, plywood or oriented strand board); concrete (poured in place or precast); gypsum (precast or poured in place) cementitous wood; slate-concrete mixtures; preformed mineralized wood fiber; and composite decks of lightweight insulating concrete on corregated steel or foam boards.

In the BUR systems of the present invention, the bottom layer of the layers of reinforcement may be attached directly to the structural deck by mechanical means (fasteners such as nails, screws, etc.) or by an application of a bitumen adhesive between the bottom layer of the reinforcement and the structural deck. More often, a base sheet is first applied to the structural deck, and two or more plied layers of reinforcement are then applied over the base sheet. The base sheets generally comprise bitumen coated felt sheets as described above which are less permeable than the saturated felts used as reinforcement layers in the membranes.

In many applications, one or more layers of insulation may be applied to the structural deck before the membrane is applied, and the insulation may be applied directly to the structural deck or to a base sheet which has been previously attached to the structural deck. Several types of insulation layers are available and useful, and these include: rigid insulation prefabricated into boards; poured insulation concrete fills; dual-purpose structural deck and insulation plank, flexible batts generally installed under metal panel or ply wood decks, and sprayed-in-place foam. Any of the materials normally used for thermal insulation in BUR systems can be utilized in the present invention, and these include, glass, perlite, isocyanurate, wood fiber, EPS, fiberglass, cork, etc.

In yet another embodiment, the lower layer of the layers of reinforcement is attached to a cover board which is attached to the upper layer of one or more layers of insulation, and the lower layer of insulation is attached to the structural deck either directly, or through a base layer as described above. The cover board may be comprised of the same material as the insulation layer, and specific examples of cover board materials include perlite, wood fiber, fiber glass, cork, etc. Generally, the cover board is attached to the insulation layers, and the insulation layers are attached to each other and to the base sheet, when present, with a bitumen-based waterproofing adhesive. In addition to the coal tar compositions described herein, any of the bitumen-based waterproofing adhesives normally used in BUR systems can be utilized in the systems of the present invention as interply adhesives. Alternatively, the insulation layers and/or the base layer can be attached mechanically to the deck.

In some applications, it is desirable to include a vapor or air barrier layer in the BUR system. A vapor barrier layer is sometimes required for roofs over humid interiors, particularly in northern climates. In one application, the vapor barrier layer is applied to the deck before the insulation layer. Vapor-barrier materials include various types of plastic sheets, aluminum foil, laminated kraft paper sheets with bitumen sandwich filler, bitumen-coated kraft paper or the bitumen-coated materials described earlier in one or more plied systems.

In one embodiment, the bitumen-based built-up roofing systems of the present invention comprise a structural deck covered with a membrane comprising:

(A) at least two layers of reinforcement, (B) at least one layer of insulation wherein the bottom layer of the layers of reinforcement is attached to the upper most layer of insulation, (C) a base layer having an upper surface and a lower surface, wherein the lower most layer of insulation is attached to the upper surface of the base layer, and the lower surface of the base layer is attached to the structural deck, (D) an applied bitumen-based waterproofing adhesive between each of the layers of reinforcement, between the lower most layer of the layers of reinforcement and the upper most insulation layer, between the insulation layers, and between the lower most insulation layer and the upper surface of the base layer whereby each of said layers is adhered to the bitumen-based adhesive between the layers, (E) a bitumen-based flood coat over the reinforcement layers, and (F) a protective layer of mineral aggregate material embedded in the flood coat, wherein the bitumen in at least the flood coat comprises the novel coal tar compositions described above.

The present invention also relates to a method of re-coating a bitumen-based built-up roofing membrane by applying a new flood coat of the coal tar compositions described in the present application. More particularly, the method of re-coating a bitumen-based built-up roofing membrane comprises the steps of:

(A) removing loose mineral aggregate, if any, from the surface of an existing roofing membrane, (B) cleaning the surface of the existing roofing membrane, (C) applying a flood coat over the cleaned surface, and (D) embedding a layer of mineral aggregate material into the flood coat wherein said flood coat comprises the coal tar compositions described above.

In a preferred embodiment, the coal tar compositions comprise:

(1) from about 80 parts to about 98 parts by weight of coal tar having an overall float test of from about 50 seconds to about 220 seconds, (2) from about 2 parts to about 20 parts by weight of coal tar pitch having a softening point of from about 140 to about 160° C., and (3) from about 1% to about 20% by weight, based on the total weight of the composition, of an acrylonitrile-butadiene copolymer.

As a first step of the method of re-coating, any loose mineral aggregate present in the existing roofing membrane should be removed. Following removal of the loose mineral aggregate, the surface of the existing roofing membrane is cleaned such as with a power broom, and in some instances may be washed to remove dirt or other surface deposits. However, if the surface is washed, it must be thoroughly dried prior to application of the flood coat. Accordingly, after the surface of the existing roofing membrane is cleaned and dried, the flood coat which comprises the coal tar compositions described in the present invention is applied over the clean surface in an amount of from about 40 to about 100 lbs/square more often from about 60 lbs/square to about 80 lbs/square. Following application of the flood coat by techniques known to those skilled in the art, a layer of inert mineral aggregate material (as described above) is embedded into the flood coat. Preferably, the inert mineral aggregate is embedded into the flood coat immediately after it is applied to the cleaned surface while the flood coat is still fluid. The amount of inert mineral aggregate embedded into the flood coat may range from about 150 to about 250 lbs/square.

The coal tar compositions described above also are useful in a method of re-coating a built-up roofing membrane having a mineral-surfaced cap sheet (no aggregate). In this application, the method comprises the steps of:

(A) cleaning the surface of the mineral-surfaced cap sheet of an existing roofing membrane, (B) applying a flood coat over the cleaned surface, (C) embedding a layer of mineral aggregate material into the flood coat wherein said flood coat comprises a coal tar composition as described above.

In one embodiment, the coal tar compositions useful in re-coating a built-up roofing membrane having a mineral-surfaced cap sheet comprises:

(1) from about 80 parts to about 98 parts by weight of coal tar having an overall float test of from about 50 seconds to about 220 seconds, (2) from about 2 parts to about 20 parts by weight of coal tar pitch having a softening point of from about 140 to about 160° C., and (3) from about 1% to about 20% by weight, based on the total weight of the composition, of an acrylonitrile-butadiene copolymer.

Mineral-surfaced cap sheets are heavily coated products that utilize a wide variety of reinforcements. These cap sheets can be asphalt or coal tar based, with or without polymer modification, and include a variety of mineral surfacings such as colored slate, ceramic or rock granules, and others. Minimum weights for these sheets typically range from 45 to 90 lb/100 ft$^2$ (2.2–4.4 kg/m$^2$).

In yet another embodiment of the present invention, the coal tar 30 composition described above can be utilized in a method of re-covering a bitumen-based built-up roofing membrane. Such method involves the steps of:

(A) removing loose mineral aggregate or mineral surfacing, if any, from the upper surface of an existing roofing membrane, (B) cleaning the upper surface of the existing roofing membrane, (C) applying one or more layers of reinforcement, the bottom layer being attached to the cleaned upper surface of the existing roofing membrane, (D) applying a bitumen-based waterproofing adhesive between each layer of reinforcement when more than one layer is applied, and between the bottom layer of reinforcement and the cleaned upper surface of the existing roofing membrane, wherein each reinforcement layer is adhered to the bitumen-based adhesive applied between the layers, and the bottom layer of reinforcement is adhered to the cleaned surface of the existing membrane, (E) applying a bitumen-based flood coat over the reinforcement layer or layers, and (F) embedding a protective layer of mineral aggregate material into the flood coat, wherein the bitumen in at least the flood coat comprises a coal tar composition as described above.

Re-covering of a bitumen-based built-up roofing membrane is feasible when: the structural deck is sound; the existing roof system is adequately anchored; the existing insulation is strong enough to resist traffic and normal impact loads, and it is essentially dry; and the existing membrane forms a reasonably smooth surface or can be economically repaired into a smooth surface. As noted above, the coal tar compositions as described herein exhibit improved compatibility with asphalt, and thus, the bitumen-based adhesives utilized to adhere the various layers together can comprise asphalt-based adhesives.

In addition to the one or more layers of reinforcement applied to the cleaned upper surface of the existing roofing membrane, other layers as described previously can be incorporated into the re-covered roofing membrane including a base layer, insulation layers, vapor or air barriers, and a cover board, if desired. In general, the method of re-covering a bitumen-based built-up roofing membrane utilizes the same components and methods described above with regard to the bitumen-based built-up roofing systems.

The coal tar compositions described herein also are useful in preparing coal tar impregnated reinforcement sheeting useful in BUR systems. Such coal tar impregnated reinforcement sheets generally comprise a layer of reinforcement which has been impregnated with a coal tar composition comprising:

(1) from about 80 parts to about 98 parts by weight of coal tar having an overall float test of from about 50 seconds to about 220 seconds, (2) from about 2 parts to about 20 parts by weight of coal tar pitch having a softening point of from about 140 to about 160° C., and (3) from about 1% to about 20% by weight, based on the total weight of the composition, of an acrylonitrile-butadiene copolymer, to provide a reinforcement containing at least about 100% by weight of the coal tar composition based on the weight of the unimpregnated reinforcement.

A wide variety of reinforcement materials as described above can be utilized in the reinforcement sheets which are impregnated with the coal tar compositions, and these include webs and felts prepared with material selected from the group consisting of organic felts, glass fiber felts, polyesters, and combinations thereof. The reinforcement sheets which have been impregnated with the coal tar compositions are useful with and compatible with asphalt adhesives and asphalt impregnated reinforcement sheets. The amount of coal tar composition present in the coal tar impregnated reinforcement sheets may vary from about 10 lbs/square to about 30 or 40 lbs/square. In one preferred embodiment, the coal tar compositions used to impregnate the reinforcement sheetings have a softening point in the range of from about 95° C. to about 115° C. and an elongation (ASTM D412) of at least about 500%. The impregnated sheets may be prepared by immersing the sheets in the coal tar compositions, or the coal tar composition can be poured over the sheets and the coal tar composition allowed to penetrate into the sheet.

As has been mentioned previously, the novel coal tar compositions described herein exhibit increased compatibility with asphalt, and this is surprising since it is well established that asphalt and coal tar pitch are chemically incompatible. For example, when asphalt is applied over coal tar, generally undesirable results are obtained such as the asphalt will soften and flow, leaving exposed coal tar pitch. Alternatively, coal tar pitch when applied over asphalt may harden and crack excessively.

In contrast, it has been discovered that the coal tar compositions of the present invention may be utilized as flood coats over membranes containing asphalt without deleterious effects.

To examine the compatibility of several asphalts with the coal tar compositions described herein, a laboratory study was developed to examine several membrane configurations. Testing involved assembling built-up membranes using asphalt-impregnated glass fiber felts, a variety of mopping grade asphalts, as well as a variety of surfacings. A complete coal tar system was used as a control. This testing represents a worst case scenario since any incompatibility would be aggravated by the presence of lower molecular weight oils (lightweight oils, etc.) present in the asphalt at the time of assembly.

Testing involved long-term exposures of each membrane system under infrared (IR) lamps set at 160° F. for 8 hours of every 24-hour period. After ten weeks of exposure at this test temperature, the IR lamps were elevated to 170° F., and the membrane samples then were exposed for an additional ten weeks.

After the total 20 weeks of IR exposure, no incompatibility was found between the various asphalts and the subject coal tar composition. Such incompatibilities will generate an oily exudate residing on the uppermost surface. This can occur in as little as a few days, or more usually within approximately 3–4 weeks.

For additional verification that no incompatibility in the form of an oily exudate existed, each membrane system was disassembled. This was accomplished by freezing the specimens to approximately −40° F. in order to look at the interior of the membrane. In several cases, the flood coat of the subject coal tar composition would also remove some of the glass fiber filaments from the uppermost reinforcement layer. Even along the immediate interface between the felt's asphalt coating and the coal tar composition, no incompatibility existed.

As a final confirmation of the improved compatibility achieved with the subject coal tar composition, the Oliensis Test (ASTM D 1370, Test Method for Contact Compatibility Between Asphaltic Materials) was used with a variety of asphalts and asphalt-coated reinforcements. In all test combinations, no oily exudate was observed, which would have indicated an incompatibility between the two test materials.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A method of re-covering a bitumen-based built-up roofing membrane which comprises the steps of:

(A) removing loose mineral aggregate or mineral surfacing, if any, from the upper surface of an existing roofing membrane, (B) cleaning the upper surface of the existing roofing membrane, (C) applying one or more layers of reinforcement, the bottom layer being attached to the cleaned upper surface of the existing roofing membrane, (D) applying a bitumen-based waterproofing adhesive between each layer of reinforcement when more than one layer is applied, and between the bottom layer of reinforcement and the cleaned upper surface of the existing roofing membrane, wherein each reinforcement layer is adhered to the bitumen-based adhesive applied between the layers, and the bottom layer of reinforcement is adhered to the cleaned surface of the existing membrane, (E) applying a bitumen-based flood coat over the applied reinforcement layer or layers, and (F) embedding a protective layer of mineral aggregate material into the flood coat, wherein the bitumen in at least the flood coat comprises a coal tar composition comprising:

(1) from about 80 parts to about 98 parts by weight of coal tar having an overall float test of from about 50 seconds to about 220 seconds, (2) from about 2 parts to about 20 parts by weight of coal tar pitch having a softening point of from about 140 to about 160° C., and (3) from about 1% to about 20% by weight, based on the total weight of the composition, of an acrylonitrile-butadiene copolymer.

2. The method of claim 1 wherein one or more insulation layers are applied over the cleaned surface of the existing roofing membrane after step (B), and the one or more layers of reinforcement applied in step (C) are applied over the insulation layers.

3. The method of claim 1 wherein one or more cover board layers are applied over the cleaned surface of the existing roofing membrane after step (B), and the one or more layers of reinforcement applied in step (C) are applied over the cover board layers.

4. The method of claim 1 wherein one or more insulation layers are applied over the cleaned surface of the existing roofing membrane and one or more cover board layers are applied over the insulation layers after step (B), and the one or more layers of reinforcement applied in step (C) are applied over the cover board layers.

5. The method of claim 1 wherein more than one layer of reinforcement is applied in step (C), and the layers are plied.

6. The method of claim 1 wherein the one or more layers of reinforcement comprise layers selected from the group consisting of bitumen saturated organic felt, bitumen impregnated glass fiber felt, bitumen-free glass fiber felt, polyester fabric and combinations thereof.

7. The method of claim 1 wherein the plied layers of reinforcement comprise layers of bitumen saturated organic felt.

8. The method of claim 1 wherein the plied layers of reinforcement comprise layers of bitumen impregnated glass fiber felt.

9. The method of claim 1 wherein the plied layers of reinforcement comprise layers of polyester fabric.

10. The method of claim 1 wherein the coal tar (1) in the blend has an overall float test of from about 150 to about 220 seconds.

11. The method of claim 1 wherein the blend comprises from about 86 parts to about 98 parts by weight of coal tar.

12. The method of claim 1 wherein the blend comprises from about 5 parts to about 18 parts by weight of the coal tar pitch.

13. The method of claim 1 wherein the coal tar pitch in the blend has a softening point of from about 145 ° C. to about 155 ° C.

14. The method of claim 1 wherein the blend comprises from about 5% to 15% by weight, based on the total weight of the composition, of an acrylonitrile-butadiene copolymer.

15. The method of claim 1 wherein the acrylonitrile-butadiene copolymer in the blend contains from about 20% to about 45% by weight of acrylonitrile.

16. The method of claim 1 wherein the acrylonitrile-butadiene copolymer in the blend contains from about 25% to about 35% by weight of acrylonitrile.

17. The method of claim 1 wherein the acrylonitrile-butadiene copolymer in the blend contains from about 5% to about 15% by weight of at least one partitioning agent.

18. The method of claim 1 wherein up to about 35 parts of the coal tar (1) in the blend is replaced with a coal tar selected from coal tars having softening points of from about 52° C. to about 60° C. and from about 56° C. to about 64° C.

19. The method of claim 1 wherein the acrylonitrile-butadiene copolymer in the blend has a Mooney viscosity (ML-4@100° C.) of from about 25 to about 85.

20. The method of claim 1 wherein the coal tar composition contains less than about 0.5% by weight of water.

21. The method of claim 1 wherein the coal tar composition is characterized as having a softening point in the range of from about 55° C. to about 70° C.

22. The method of claim 1 wherein the coal tar composition is characterized as having an elongation (ASTM D412) of at least about 1000%.

23. A method of re-coating a bitumen-based built-up roofing membrane which comprises the steps of:

(A) removing loose mineral aggregate, if any, from the surface of an existing roofing membrane, (B) cleaning the surface of the existing roofing membrane, (C) applying a flood coat over the cleaned surface, and (D) embedding a layer of mineral aggregate material into the flood coat wherein said flood coat comprises a coal tar composition comprising:

(1) from about 80 parts to about 98 parts by weight of coal tar having an overall float test of from about 50 seconds to about 220 seconds, (2) from about 2 parts to about 20 parts by weight of coal tar pitch having a softening point of from about 140 to about 160° C., and (3) from about 1% to about 20% by weight, based on the total weight of the composition, of an acrylonitrile-butadiene copolymer.

24. The method of claim 23 wherein the cleaned surface obtained in step (B) is dried prior to step (C).

25. The method of claim 23 wherein the coal tar (1) in the blend has an overall float test of from about 150 to about 220 seconds.

26. The method of claim 23 wherein the blend comprises from about 86 parts to about 98 parts by weight of coal tar.

27. The method of claim 23 wherein the blend comprises from about 5 parts to about 18 parts by weight of the coal tar pitch.

28. The method of claim 23 wherein the coal tar pitch in the blend has a softening point of from about 145° C. to about 155° C.

29. The method of claim 23 wherein the blend comprises from about 5% to 15% by weight, based on the total weight of the composition, of an acrylonitrile-butadiene copolymer.

30. The method of claim 23 wherein the acrylonitrile-butadiene copolymer in the blend contains from about 20% to about 45% by weight of acrylonitrile.

31. The method of claim 23 wherein the acrylonitrile-butadiene copolymer in the blend contains from about 25% to about 35% by weight of acrylonitrile.

32. The method of claim 23 wherein the acrylonitrile-butadiene copolymer in the blend contains from about 5% to about 15% by weight of at least one partitioning agent.

33. The method of claim 23 wherein up to about 35 parts of the coal tar (1) in the blend is replaced with a coal tar selected from coal tars having softening points of from about 52° C. to about 60° C. and from about 56° C. to about 64° C.

34. The method of claim 23 wherein the acrylonitrile-butadiene copolymer in the blend has a Mooney viscosity (ML-4@100° C.) of from about 25 to about 85.

35. The method of claim 23 wherein the coal tar composition contains less than about 0.5% by weight of water.

36. The method of claim 23 wherein the coal tar composition is characterized as having a softening point in the range of from about 55° C. to about 70° C.

37. The method of claim 23 wherein the coal tar composition is characterized as having an elongation (ASTM D412) of at least about 500%.

38. A method of re-coating a built-up roofing membrane having a mineral-surfaced cap sheet which comprises the steps of:
- (A) cleaning the surface of the mineral-surfaced cap sheet of an existing roofing membrane,
- (B) applying a flood coat over the cleaned surface,
- (C) embedding a layer of inert mineral aggregate material into the flood coat wherein said flood coat comprises a coal tar composition comprising:
  - (1) from about 80 parts to about 98 parts by weight of coal tar having an overall float test of from about 50 seconds to about 220 seconds,
  - (2) from about 2 parts to about 20 parts by weight of coal tar pitch having a softening point of from about 140 to about 160° C., and
  - (3) from about 1% to about 20% by weight, based on the total weight of the composition, of an acrylonitrile-butadiene copolymer.

39. The method of claim 38 wherein the cleaned surface obtained in step (B) is dried prior to step (C).

40. The method of claim 38 wherein the coal tar (1) in the blend has an overall float test of from about 150 to about 220 seconds.

41. The method of claim 38 wherein the blend comprises from about 86 parts to about 98 parts by weight of coal tar.

42. The method of claim 38 wherein the blend comprises from about 5 parts to about 18 parts by weight of the coal tar pitch.

43. The method of claim 38 wherein the coal tar pitch in the blend has a softening point of from about 145° C. to about 155° C.

44. The method of claim 38 wherein the blend comprises from about 5% to 15% by weight, based on the total weight of the composition, of an acrylonitrile-butadiene copolymer.

45. The method of claim 38 wherein the acrylonitrile-butadiene copolymer in the blend contains from about 20% to about 45% by weight of acrylonitrile.

46. The method of claim 38 wherein the acrylonitrile-butadiene copolymer in the blend contains from about 25% to about 35% by weight of acrylonitrile.

47. The method of claim 38 wherein the acrylonitrile-butadiene copolymer in the blend contains from about 5% to about 15% by weight of at least one partitioning agent.

48. The method of claim 38 wherein up to about 35 parts of the coal tar (1) in the blend is replaced with a coal tar selected from coal tars having softening points of from about 52° C. to about 60° C. and from about 56° C. to about 64° C.

49. The method of claim 38 wherein the acrylonitrile-butadiene copolymer in the blend has a Mooney viscosity (ML-4@100° C.) of from about 25 to about 85.

50. The method of claim 38 wherein the coal tar composition contains less than about 0.5% by weight of water.

51. The method of claim 38 wherein the coal tar composition is characterized as having a softening point in the range of from about 55° C. to about 70° C.

52. The method of claim 38 wherein the coal tar composition is characterized as having an elongation (ASTM D412) of at least about 1000%.

* * * * *